Dec. 30, 1941.     C. C. PALMER     2,268,526
GALVANOMETER
Filed April 6, 1938
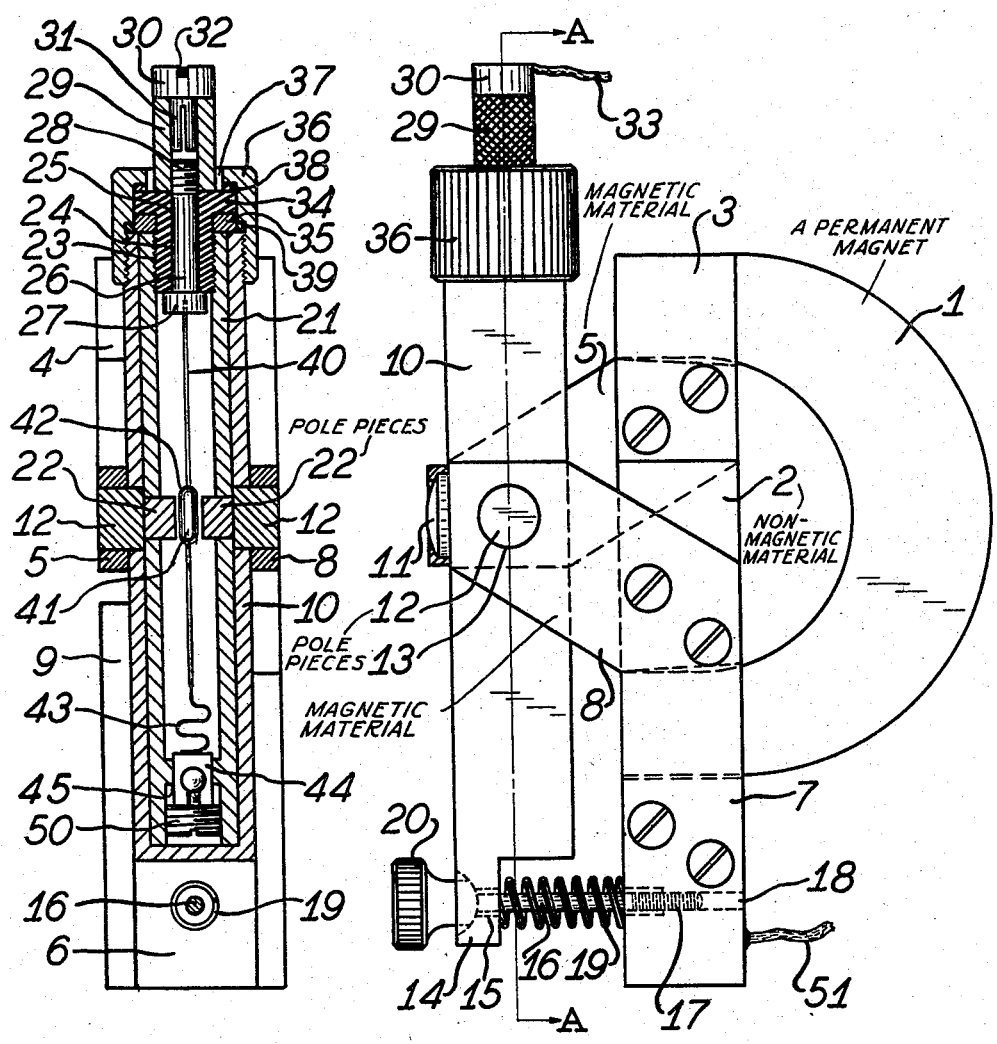
FIG_1_
FIG_2_
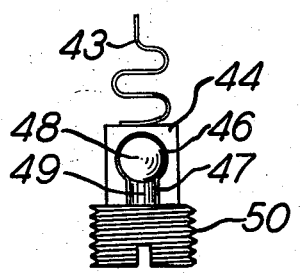
FIG_3_
Carl C. Palmer INVENTOR.
BY G. L. Young
ATTORNEY.

Patented Dec. 30, 1941

2,268,526

UNITED STATES PATENT OFFICE 2,268,526

GALVANOMETER

Carl C. Palmer, Houston, Tex., assignor to Standard Oil Development Company, a corporation of Delaware Application April 6, 1938, Serial No. 200,361

3 Claims. (Cl. 171—95)

The present invention is directed to an improved galvanometer and especially to a galvanometer suitable for use in various seismic and geophysical prospecting methods, particularly seismic prospecting.

In order to be useful in geophysical prospecting and particularly in seismic prospecting, a galvanometer must meet many requirements. To begin with it must be extremely sensitive in order that it may correctly record the arrival of the reflected waves of low energy content. At the same time it must be rugged in order that it may withstand the jolts and shocks it receives in transportation and use without becoming unreliable.

In seismic prospecting a plurality of pickups ranging in number from 6 to 12 are employed. Each pickup is connected to a galvanometer and the various galvanometers are ranged so as to cast their beams on a single strip of light sensitive paper. Necessarily, therefore, galvanometers used in this art must be small and compact and of such a shape as to be capable of arrangement in a battery of such size that the beams from all the galvanometers can be brought into play on a single strip of paper. In addition, the galvanometer must be easily adjustable, both with regard to its sensitivity, in order that it may always be kept within the extremely small permissible limits of error, and with regard to the direction of the beam of light emitted by it so that the various beams may be caused to strike the light sensitive paper in the desired position to permit interpretation of the record.

The principal object of the present invention is the provision of a galvanometer which will meet all of the above requirements.

Further objects and advantages of the present invention will appear from the accompanying drawing in which—

Figure 1 is a front elevation sectioned along the line A—A of Figure 2 of a galvanometer according to the present invention;

Figure 2 is a side elevation of a galvanometer according to the present invention; and Figure 3 is a detail of the arrangement employed for adjusting the tension of the wires used for suspending the galvanometer mirror.

Referring to the drawing in detail, numeral 1 designates a permanent magnet of the U-shaped type, between the poles of which is a piece of nonmagnetic material 2. Laid against one side of one pole of the magnet and secured to insulating material 2 by screws or otherwise, is a metal strap 3. Similarly arranged on the other side of the same pole is a strap of magnetic metal 4 having a laterally offset arm 5 the purpose of which will be hereinafter described.

Arranged in abutting relation with the other pole of the magnet is a metal block or base member 6. Secured to block 6 and to member 2, by screws or otherwise, is a metal strap 7 which has a laterally offset arm 8, the free end of which is spaced from the free end of arm 5 a distance substantially equal to the thickness of the magnet, for the purpose hereinafter specified. Screwed to the opposite side of block 6 and member 2 is a metal strap 9.

Viewed from the outside the galvanometer itself consists of an elongated chamber 10 which may be square or cylindrical and which is provided, intermediate its ends, with a lens 11 by means of which light can be transmitted from the exterior to the interior of the casing, and is also provided with a pair of magnetic poles 12 fixed in diametrically opposite portions of the casing so as to be flush with the interior of the casing and to project from the exterior thereof in a position to be received in holes 13 in the arms 5 and 8. In other words, the chamber 10 is pivoted in arms 5 and 8.

The lower end of chamber 10 is closed and is provided with a depending lip 14 which has a perforation 15 adapted to receive a bolt 16 which has a threaded end 17 adapted to be received in a threaded socket 18 in the base member 6. Mounted between the base member 6 and the lip 14 and encircling the bolt 16 is a spring 19 adapted to force the lower end of the casing outwardly. The bolt is provided with a knurled head 20 by which it is adjusted.

The interior of chamber 10 in cylindrical in form and is milled to receive a cylindrical sleeve 21 which is open ended and is co-extensive in length with the interior of the chamber. Sleeve 21 is also provided with pole pieces 22 which are adapted to frictionally engage pole pieces 12 when the sleeve is properly positioned and which project into the interior of the sleeve.

The upper end of sleeve 21 has internal threads 23 adapted to receive an externally threaded insulating plug 24 which has a central bore 25. Slidingly arranged in bore 25 is a rod 26 having a head 27 adapted to seat against the lower annular surface of plug 24 and a screw threaded end 28 adapted to project beyond the other end of the plug 24. Screwed onto the threaded end 28 of rod 26 is a sleeve 29 having an open end in which is inserted a stud 30 having spring-like fingers 31 which are imbedded in the sleeve 29 and are spring-pressed outwardly against the inner wall thereof. The head of stud 30 is provided with a slot 32 in which is soldered a lead 33 of the galvanometer.

The head of insulating plug 24 is of greater diameter than the screw-threaded portion thereof whereby a flange 34 is formed on the upper end of the plug. Between this flange and the flush edge of chamber 10 and sleeve 21 is a ring 35 of conductive material such as copper or bronze, said ring being of sufficient width to span the thickness of sleeve 21 and part of the thickness of casing 10. The purpose of this construction will become apparent in the further description of this galvanometer.

Sleeve 21 is held in place by a cap 36 of sufficient dimensions to receive the flared head of plug 24. Cap 36 is provided with a central opening 37 of sufficient dimension to have its periphery spaced from the outer surface of sleeve 29. The other end of cap 36 is threaded to receive the exteriorly threaded open end of casing 10. Rings of suitable packing material 38 and 39 are provided so that a tight joint can be made.

Secured to head 27 of rod 26 is a suspension wire or filament 40 for the mirror 41 of the galvanometer. This wire is attached to a coil of a few turns 42 around the mirror which is suspended between the pole pieces 22 in a position to reflect light through the lens 11, sleeve 21 being suitably cut away for this purpose. The lower end or continuation of wire or filament 40 is also attached to coil 42 and is soldered to a spring member 43 which in turn is soldered, or otherwise attached, to a block 44 of non-circular cross section, slidingly engaging the inner mating surface of an inwardly directed flange 45 in the lower end of sleeve 21. Block 44 is provided with an interior spherical cavity 46 which is connected to one face of block 44 by a cylindrical passage 47. Seated in cavity 46 is a sphere 48 provided with a rod passing through passage 47 and connected to a threaded plug 50 which is adapted to engage interior threads in the lower end of sleeve 21. As can be seen, tension in spring 43, and consequently in the filament 40, can be increased by turning threaded plug 50 to the left and decreased by turning plug 50 to the right.

With the parts assembled as shown in the drawing the interior of the sleeve 21 and the casing 10 is usually filled with oil so as to damp the movement of the mirror. For this reason there is a film of oil between the casing 10 and the sleeve 21. The current passing through the galvanometer enters through lead 33, passes through stud 30, through sleeve 29, through rod 26, filament 40, coil 42 to block 44 and thus to sleeve 21. In order to make an easy path for the current from sleeve 21 to casing 10 the conductive ring 35 is provided. The ground wire can be connected either to casing 10 or any part in electrical contact therewith. In the drawing the ground wire 51 is shown connected to block 6.

Assuming the upper pole of magnet 1 to be the north pole, the lines of magnetic flux pass through metal band 4, to arm 5 to the corresponding pole pieces 12 and 22, to the coil 42, to the opposite pole pieces 22 and 12, through arm 8 and thence to the south pole of the magnet. In practice these galvanometers are arranged in batteries side by side. Accordingly, adjacent galvanometers are made with reversed poles so that adjacent poles will be of the same polarity, thereby eliminating the dissipation of the magnetic flux in any given galvanometer.

It is recognized that many changes in design and arrangement of parts can be made without departing from the principles underlying the present invention. Such changes are contemplated within the scope of the appended claims in which it is intended to claim the present invention as broadly as the prior art permits.

I claim:

1. A galvanometer comprising a casing, a sleeve slidingly arranged in said casing, a screw-threaded plug of insulating material carried by the exposed end of said sleeve, an electrically conductive rod passing through said plug and insulated from said sleeve, a conductor secured to said rod, a coil carried by said conductor, an electrical conductor connecting said coil to said sleeve, a flange on said insulating plug and an electrically conductive ring arranged between said flange and the end of said sleeve, said ring being of sufficient width to simultaneously contact said sleeve and said casing.

2. A galvanometer comprising a casing, a sleeve slidingly arranged in said casing, a coil suspended from the upper end of said sleeve, a spring in the lower end of said sleeve, means connecting said spring with said coil, a block of non-circular cross section attached to the lower end of said spring, a guideway of corresponding cross section provided in the lower end of said sleeve for said block, said block being provided with a spherical cavity and, a passageway connecting said cavity to the exterior of said block, a sphere mounted in said cavity provided with a rod passing through said passage and a screw-threaded plug secured to said rod and carried by the lower end of said sleeve.

3. A galvanometer comprising a permanent magnet, a casing, a sleeve slidingly arranged in said casing, a coil suspended from the upper end of said sleeve, a mirror carried by said coil in the longitudinal axis of rotation of said sleeve, means for mounting said casing for rotation about a horizontal axis passing through said mirror and a pair of magnetic arms extending from said mounting means to the poles of said magnet.

CARL C. PALMER.